US010616230B2

(12) United States Patent
Singh et al.

(10) Patent No.: US 10,616,230 B2
(45) Date of Patent: *Apr. 7, 2020

(54) MANAGING AUTHORIZATION TOKENS FOR CALLING THIRD-PARTY VENDORS

(71) Applicant: salesforce.com, inc., San Francisco, CA (US)

(72) Inventors: Prabhjot Singh, Union City, CA (US); Kavitha Elangovan, Fremont, CA (US); Dmytro Kudriavtsev, Belmont, CA (US)

(73) Assignee: salesforce.com, inc., San Francisco, CA (US)

( * ) Notice: Subject to any disclaimer, the term of this patent is extended or adjusted under 35 U.S.C. 154(b) by 114 days.

This patent is subject to a terminal disclaimer.

(21) Appl. No.: 15/877,703

(22) Filed: Jan. 23, 2018

(65) Prior Publication Data
US 2019/0230081 A1 Jul. 25, 2019

(51) Int. Cl.
*G06F 15/16* (2006.01)
*H04L 29/06* (2006.01)
*G06F 9/54* (2006.01)
*G06F 9/455* (2018.01)

(52) U.S. Cl.
CPC .......... *H04L 63/10* (2013.01); *G06F 9/547* (2013.01); *G06F 9/45558* (2013.01); *G06F 2009/45595* (2013.01); *H04L 63/083* (2013.01)

(58) Field of Classification Search
CPC .................................................. G06F 9/547
See application file for complete search history.

(56) References Cited

U.S. PATENT DOCUMENTS

| 5,577,188 A | 11/1996 | Zhu |
| 5,608,872 A | 3/1997 | Schwartz |
| 5,649,104 A | 7/1997 | Carleton |
| 5,715,450 A | 2/1998 | Ambrose et al. |
| 5,761,419 A | 6/1998 | Schwartz |
| 5,819,038 A | 10/1998 | Carleton |
| 5,821,937 A | 10/1998 | Tonelli et al. |
| 5,831,610 A | 11/1998 | Tonelli et al. |
| 5,873,096 A | 2/1999 | Lim et al. |

(Continued)

OTHER PUBLICATIONS

U.S. Appl. No. 13/986,251, dated Apr. 16, 2013.

*Primary Examiner* — Douglas B Blair
(74) *Attorney, Agent, or Firm* — Dergosits & Noah LLP; Todd A. Noah

(57) ABSTRACT

Managing authorization tokens for calling third-party vendors is described. A system identifies a current call from a client computing system to an API associated with a third-party vendor, the call including a configuration file for calling the API. The system determines, in response to a determination that a previous call was made to the API, whether a previous call was made to the API and whether a part of the configuration file in the current call matches a corresponding configuration file in the previous call. The system enables the API to authorize the current call by sending a copy of a previous authorization token to the client computing system, in response to a determination that the part of the configuration file in the current call matches the corresponding part of the configuration file in the previous call, the previous authorization being previously received from the API for the previous call.

20 Claims, 4 Drawing Sheets

(56) References Cited

U.S. PATENT DOCUMENTS

| | | |
|---|---|---|
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,957,199 B1 * | 10/2005 | Fisher .................... G06Q 20/02 705/50 |
| 7,062,502 B1 | 6/2006 | Kesler |
| 7,340,411 B2 | 3/2008 | Cook |
| 7,356,482 B2 | 4/2008 | Frankland et al. |
| 7,401,094 B1 | 7/2008 | Kesler |
| 7,620,655 B2 | 11/2009 | Larsson |
| 7,698,160 B2 | 4/2010 | Beaven et al. |
| 7,779,475 B2 | 8/2010 | Jakobson et al. |
| 7,851,004 B2 | 12/2010 | Hirao et al. |
| 8,010,663 B2 | 8/2011 | Firminger et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,209,308 B2 | 6/2012 | Jakobson et al. |
| 8,275,836 B2 | 9/2012 | Beaven et al. |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 10,169,035 B1 * | 1/2019 | Caspi ....................... G06F 8/73 |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2012/0233137 A1 | 9/2012 | Jakobson et al. |
| 2013/0218948 A1 | 8/2013 | Jakobson |
| 2013/0218949 A1 | 8/2013 | Jakobson |
| 2013/0218966 A1 | 8/2013 | Jakobson |
| 2014/0359537 A1 | 12/2014 | Jakobson et al. |
| 2015/0007050 A1 | 1/2015 | Jakobson et al. |
| 2015/0095162 A1 | 4/2015 | Jakobson et al. |
| 2015/0172563 A1 | 6/2015 | Jakobson et al. |
| 2015/0365348 A1 * | 12/2015 | Matsuda ................. H04L 67/10 709/225 |
| 2017/0185797 A1 * | 6/2017 | Valine ................. G06F 21/6227 |
| 2017/0344481 A1 * | 11/2017 | Pack, III ............. H04L 67/2842 |
| 2017/0344484 A1 * | 11/2017 | Pack, III ............. G06F 12/0862 |
| 2018/0139109 A1 * | 5/2018 | Zuerner ............. H04L 41/5051 |
| 2019/0196796 A1 * | 6/2019 | Bahrami ................. G06F 8/36 |

* cited by examiner

MANAGING AUTHORIZATION TOKENS FOR CALLING THIRD-PARTY VENDORS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

A client-server model is a distributed application structure that partitions tasks or workloads between the providers of a resource or service, called servers, and requesters of a resource or service, called clients. Often clients and servers communicate over a computer network on separate hardware, but both clients and servers may reside in the same system. Servers can execute server programs, await incoming requests for resources or services, and share their resources or services with clients that initiate communication sessions with the servers to request resources or services enabled by the executing server programs.

Examples of computer applications that use a client-server model include email and the World Wide Web (WWW). A server can host a database system that manages information in objects, such as a database system that stores records for each customer in a customer relationship management (CRM) database. An object is a digital entity that can store information, such as a customer's given name, family name, job title, employer name, street address, city, state, zip code, e-mail address, and phone number. Each instance of an object may be referred to as a record.

A client can call a server's application programming interface (API) to initiate a communication session with the server. The first time that a client calls to initiate a communication session with a server, the server may send a token to the client. A token, which may be referred to as an authorization token, can be a unique identifier that is generated and sent from a server to a client to authorize a communication session between the client and the server. A token is different from a user identifier (ID) in that communication sessions are typically short-lived, expiring after a preset time of inactivity that may be minutes or hours. A client may provide a token to continue an existing communication session with a server or to initiate a new communication session with a server. A server that is communicating with a client may enable the client to call on a third-party vendor's API to initiate a communication session with the third-party vendor. The third-party vendor can respond to such a request by sending a third-party authorization token to authorize a communication session between the client and the third-party vendor.

A third-party vendor's server can provide a client with the configuration file required to configure calls to the third-party vendor's API to initiate communication sessions with the third-party vendor's server. For example, when a client registers with a third-party vendor's data service hosted by the third-party vendor's server, the server responds by providing the third-party vendor's configuration file that the client can use to configure calls to the third-party vendor's API. In another example, after the third-party vendor's server changes the authentication mechanism specified by the third-party vendor's configuration file for calling the third-party vendor's API, the server sends the updated configuration file to the client because the client previously registered with the third-party vendor's data service. Consequently, the registered clients always have the most recently updated configuration files required to call the API for the third-party vendor's server. A configuration file can be data that specifies an arrangement or a set-up, and which is stored in a computer's memory or on a storage device under a single identifying name. For example, a third-party vendor's configuration file can specify the API Uniform Resource Locator (URL), the request definitions, the response definitions, the content type, the response type, the retry interval, the unique name for the third-party vendor, the refresh interval if needed, the password header, and the authentication mechanism required for a call made to the third-party vendor's API. Examples of authentication mechanisms include Oauth2, basic authentication, token based authentication, and configuration based custom authentication.

BRIEF SUMMARY

In accordance with embodiments, there are provided systems and methods for managing authorization tokens for calling third-party vendors. A system identifies a current call from a client to a third-party vendor's API, the current call including a configuration file for calling the API. If the system determines that a previous call was made to the API, and if the system determines that the configuration file in the current call matches the configuration file in the previous call, then the system enables the API to authorize the current call by sending a copy of a previous authorization token to the client. The previous authorization token was previously received from the API for the previous call.

For example, a server identifies that an authorized user's desktop computer is currently calling the API for the Dun & Bradstreet® (D&B) business information service. The current call includes the configuration file for the D&B API. Since a user previously called the D&B API, and since the current call's configuration file is the same as the previous call's configuration file, the server enables the D&B API to authorize the desktop computer's current call by sending a copy of the previously received and currently unexpired D&B authorization token to the desktop computer.

Since neither the server nor the desktop computer had to make another authentication call to request another authorization token from the D&B API, the number of authentication calls is minimized. A minimized number of authentication calls improves the server's security, because fewer opportunities exist for an authentication call to fail and be retried, and conserves the server's resources, because processor cycles and time are not spent on requesting valid authorization tokens that the server has already stored.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Systems and methods are provided for managing authorization tokens for calling third-party vendors. As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system. Next, systems and methods for managing authorization tokens for calling third-party vendors will be described with reference to example embodiments. The following detailed description will first describe a system for managing authorization tokens for calling third-party vendors. Next, an example method for managing authorization tokens for calling third-party vendors is described.

Figure 1:
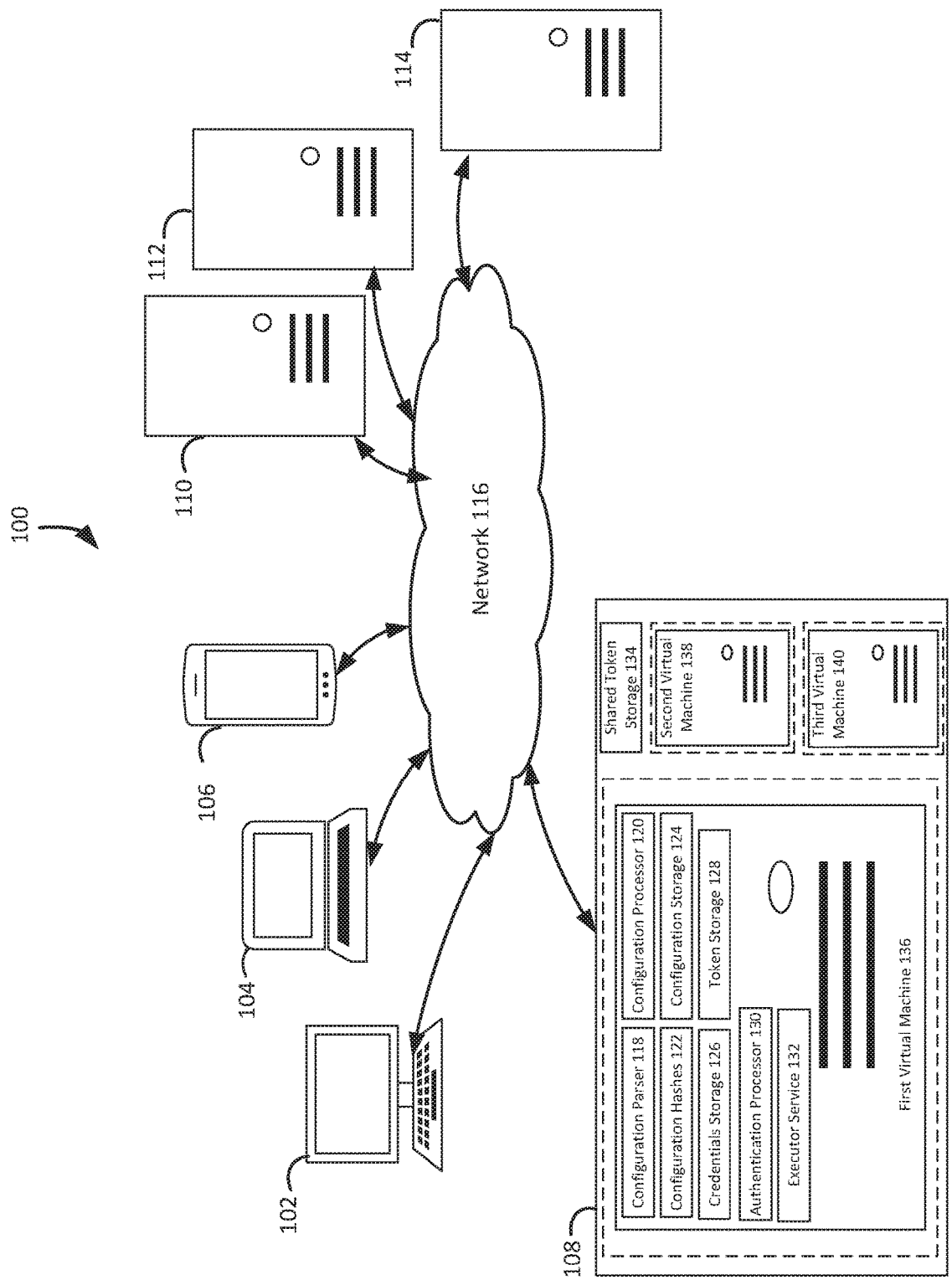
FIG. 1 illustrates a block diagram of an example system for managing authorization tokens for calling third-party vendors, in an embodiment.

FIG. 1 illustrates a block diagram of a system 100 that implements managing authorization tokens for calling third-party vendors, under an embodiment. As shown in FIG. 1, the system 100 may illustrate a cloud computing environment in which data, applications, services, and other resources are stored and delivered through shared datacenters and appear as a single point of access for the users. The system 100 may also represent any other type of distributed computer network environment in which servers control the storage and distribution of resources and services for different client users.

In an embodiment, the system 100 represents a cloud computing system that includes a first client 102, a second client 104, and a third client 106; and a server 108 that may be provided by a hosting company. Although FIG. 1 depicts the first client 102 as the personal computer 102, the second client 104 as the laptop computer 104, and the third client 106 as the smart phone 106, any of the clients 102-106 may be any type of computer, such as the user system 312 depicted in FIG. 3 and described below. While the clients 102-106 communicate with the server 108, the clients 102-106 may also communicate with a first third-party vendor's server 110, a second third-party vendor's server 112, and/or a third third-party vendor's server 114. The server 110 may host the D&B service and be referred to as the D&B server 110. The servers 108-114 may each be substantially similar to the system 316 depicted in FIG. 3 and described below. The clients 102-106 and the servers 108-114 communicate via a network 116. Although FIG. 1 depicts the system 100 with three clients 102-106, four servers 108-114, and one network 116, the system 100 may include any number of clients 102-106, any number of servers 108-114, and any number of networks 116. While FIG. 1 depicts the first server 108 having a configuration parser 118, a configuration processor 120, configuration hashes 122, a configuration storage 124, a credential storage 126, a token storage 128, an authentication processor 130, an executor service 132, and a shared token storage 134, the elements 118-134 may be combined together and/or divided into additional elements. Furthermore, a first virtual machine 136 may include the elements 118-132, while each of a second virtual machine 138, a third virtual machine 140, and the clients 102-106 may include elements that are substantially similar to the elements 118-132. Consequently, although the clients 102-106 are described as communicating with the server 108 to manage authorization tokens for calling third-party vendors, each of the clients 102-106 may communicate with a corresponding plug-in, which includes elements that are substantially similar to the elements 118-132, to manage authorization tokens for calling third-party vendors. A plug-in which includes elements that are substantially similar to the elements 118-132 can be embodied in any form or format, such as a Java Archive (JAR) file and/or library. Although FIG. 1 depicts the executor service 132 as an element that is in both the server 108 and the first virtual machine 136, the executor service 132 may be an element that is separate from both the server 108 and the first virtual machine 136. While FIG. 1 depicts the system 100 with three virtual machines 136-140, which may be referred to as the nodes 136-140, the system 100 may include any number of virtual machines 136-140.

A current call from a client to a third-party vendor's API is identified, the current call including a configuration file for calling the API. For example, the server 108 identifies that the authorized user's desktop computer 102 is currently calling the API for the D&B service hosted by the server 110, because the configuration parser 118 identifies that the current call includes the D&B configuration file for the D&B API. A current call can be a substantially present-time action that requests the execution of a routine. A client can be a device that requests a resource or service over a computer network. An application programming interface (API) can be a set of clearly defined methods of communication between various software components. A third-party vendor can be an organization that offers something for use in an interaction, that may be indirectly involved in the interaction, but is not one of the two principal participants in the interaction.

After identifying a current call to a third-party vendor's API, a determination is made whether a previous call was made to the third-party vendor's API. For example, the server 108 compares the identifier of the currently called D&B API against a registered list of identifiers for every previously called APIs to determine if any user previously called the D&B API. A previous call can be an action that occurred before the present time and that requested the execution of a routine.

If a previous call was made to the third-party vendor's API, a determination is made whether the configuration file in the current call to the third-party vendor's API matches a configuration file in the previous call to the third-party vendor's API. For example, since an authorized user previously called the D&B API, the server 108 determines if the current call's configuration file is the same as the previous call's configuration file by comparing the hash of the current call's configuration file request definitions against the hash of the previous call's configuration file request definitions stored in the configuration hashes 122. If the configuration hashes 122 that store the previous call's configuration file request definitions is stored in the memory of the server 108, then the server 108 can quickly compare any hashes of configuration files for current calls and previous calls, thereby avoiding any performance impact. Matching can be identifying a pair of items that correspond or are very similar. A hash can be a string of elements that is generated from and substantially smaller than an original string of elements, and is generated by a formula in such a way that it is extremely unlikely that the formula will generate the same substantially smaller string for some other original string.

If the configuration file in the current call to the third-party vendor's API matches the configuration file in the previous call to the third-party vendor's API, then the third-party vendor's API is enabled to authorize the current call by sending a copy of a previous authorization token to the client, the previous authorization token having been previously received from the third-party vendor's API for the previous call. For example, the server 108 determines that the hash of the current call's configuration file request definitions is the same as the hash of the previous call's configuration file request definitions. Therefore, the server 108 enables the D&B API to authorize the desktop computer 102's current call by sending a copy of the previous D&B authorization token, which was previously received from the D&B API, is currently unexpired, and stored in the token storage 128, to the desktop computer 102. Token expiration logic is described below for requesting a copy of a refreshed authorization token from the third-party vendor's API in case the authorization token is expired. If the token storage 128 that stores the previous authorization tokens resides in the memory of the server 108, then the server 108 can quickly serve any previous authorization token to any of the clients 102-106, thereby avoiding any performance impact. A previous authorization token can be a unique identifier that was generated and sent from a server to a client before the present time to authorize a communication session between the client and the server.

Since neither the server 108 nor the desktop computer 102 had to make another authentication call to request another authorization token from the D&B API, the number of authentication calls is minimized. A minimized number of authentication calls improves the security of the server 108, because fewer opportunities exist for an authentication call to fail and be retried, and conserves the resources of the server 108, because processor cycles and time are not spent on requesting valid authorization tokens that the token storage 128 has already stored.

If no previous call was made to the third-party vendor's API, then a copy of a current authorization token may be requested from the third-party vendor's API. For example, the server 108 examines the registered list of identifiers for every previously called third-party vendor's API, and determines that no previous call was made to the D&B API. Therefore, the authentication processor 130 uses the credentials stored in the credential storage 126 and the configuration file from the current call to create a third-party vendor-understandable authentication call that requests a copy of the current D&B authorization token from the D&B API. After requesting a copy of a current authorization token from the third-party vendor's API, the copy of the current authorization token received from the third-party vendor's API may be sent to the client currently calling the third-party vendor's API. For example, the authentication processor 130 receives a response from the D&B API, parses a copy of the current D&B authorization token from the response, and sends the copy of the current D&B authorization token to the desktop computer 102 and to the token storage 128, where the current D&B authorization token may be retrieved and used for subsequent calls to the D&B API. The authentication processor 130 responds to the desktop computer 102 calling an API for a new third-party vendor by managing a new authorization token for the new third-party vendor, without the need to be restarted or have any program code changed. A current authorization token can be a unique identifier that is generated and sent from a server to a client during the present time to authorize a communication session between the client and the server.

If the part of the configuration file in the current call to the third-party vendor's API does not match the corresponding part of the configuration file in the previous call to the third-party vendor's API, a copy of a current authorization token may be requested from the third-party vendor's API. For example, the authentication processor 130 uses credentials stored in the credential storage 126 and the configuration file from the current call to create a third-party vendor-understandable authentication call that requests a copy of the current D&B authorization token from the D&B API, because the hash of the current call's configuration file request definitions does not match the hash of the previous call's configuration file request definitions. After requesting a copy of a current authorization token from the third-party vendor's API, the copy of the current authorization token, which was received from the third-party vendor's API, may be sent to the client currently calling the third-party vendor's API. For example, the authentication processor 130 receives a response from the D&B API, parses a copy of the current D&B authorization token from the response, and sends the copy of the current D&B authorization token to the desktop computer 102 and to the token storage 128. The current D&B authorization token replaces the previous D&B authorization token in the token storage 128, where the current D&B authorization token may be retrieved and used for subsequent calls to the D&B API. The authentication processor 130 responds to the desktop computer 102 using a new configuration file to call an API for an existing third-party vendor by managing a new authorization token called with the new configuration file, without the need to be restarted or have any program code changed.

Having identified a current call, which includes a configuration file, to the third-party vendor's API, the configuration file in the current call to the third-party vendor's API may be stored into a persistent storage for configuration files. For example, the authentication processor 130 instructs the configuration processor 120 to store the D&B configuration file in the current call to D&B into the configuration storage 124, to generate a hash of the D&B configuration file request definitions, and store the hash of the D&B configuration file request definitions in the credential hashes 122 for matching with the hashes of subsequent configuration files' request definitions. The D&B configuration file is stored into the configuration storage 124 for the first time if the D&B API is being called for the first time. Alternatively, the D&B configuration file replaces the previous D&B configuration file in the configuration storage 124 if the D&B API has been previously called and the D&B configuration file has changed since the previous call. A persistent storage can be a device that retains data after power to the device is shut off.

Periodically, in case of an expired token, and/or on demand, a node can request a copy of a refreshed authorization token from the third-party vendor's API, based on token expiration logic. For example, the executor service 132, which may be in or separate from the first virtual machine 136, uses credentials in the credential storage 126 and the configuration file from the configuration storage 124 to create a third-party vendor-understandable authentication call that requests a copy of a refreshed D&B authorization token from the D&B API every 8 hours, because the authorized user of the desktop computer 102 requests a refreshing of authorization tokens every 8 hours. In an alternative example, the executor service 132, which may be in or separate from the first virtual machine 136, uses credentials in the credential storage 126 and the configuration file from the configuration storage 124 to create a third-party vendor-understandable authentication call that requests a copy of a refreshed D&B authorization token from the D&B API every 24 hours, because the D&B configuration file specifies a refreshing of its authorization token every 24 hours. A node can be a computer that is attached to a network. A refreshed authorization token can be a unique identifier that is updated and sent from a server to a client to authorize a communication session between the client and the server. Token expiration logic can be a set of principals in a computer that specify the validity duration for a unique identifier that is generated and sent from a server to a client to authorize a communication session between the client and the server.

After requesting a copy of a refreshed authorization token from the third-party vendor's API, the requesting node can store the copy of the refreshed authorization token in a shared token storage. For example, the executor service 132, which may be in or separate from the first virtual machine 136, stores the copy of the refreshed D&B authorization token in the shared token storage 134 that is shared by the virtual machines 136-140. Shared token storage can be a computer retention of a unique identifier that is generated and sent from a server to a client that can be used to authorize a communication session between the server and multiple clients. If a part of another configuration file in another call to the third-party vendor's API matches a corresponding part of the configuration file in the previous call to the third-party vendor's API, another node can provide another copy of the refreshed authorization token in the shared token storage to another client making the other call to the third-party vendor's API. For example, the third virtual machine 140 provides another copy of the refreshed D&B authorization token, from the shared token storage 134 that is shared by the virtual machines 136-140, to the laptop computer 104 that is making another call to the D&B API, because the hash of the configuration file's request definitions in the call from the laptop computer 104 to the D&B API matches the hash of the configuration file's request definitions in the most recent call to the D&B API. Each node in a multi-node system does not have to make an authentication call to refresh the same authorization token from the same third-party vendor's API. Instead, a multi-node system's resources are conserved when only one node in the multi-node system functions as a leader node by making an authentication call to refresh an authorization token from a third-party vendor's API, and then storing the refreshed authorization token in the shared token storage, from which the other nodes in the multi-node system can retrieve and use the refreshed authorization token for subsequent calls to the third-party vendor's API. The function of the leader node may differ for different authorization tokens, as one node may function as the leader node for one authorization token, while another node may function as the leader node for another authorization token.

Figure 2:
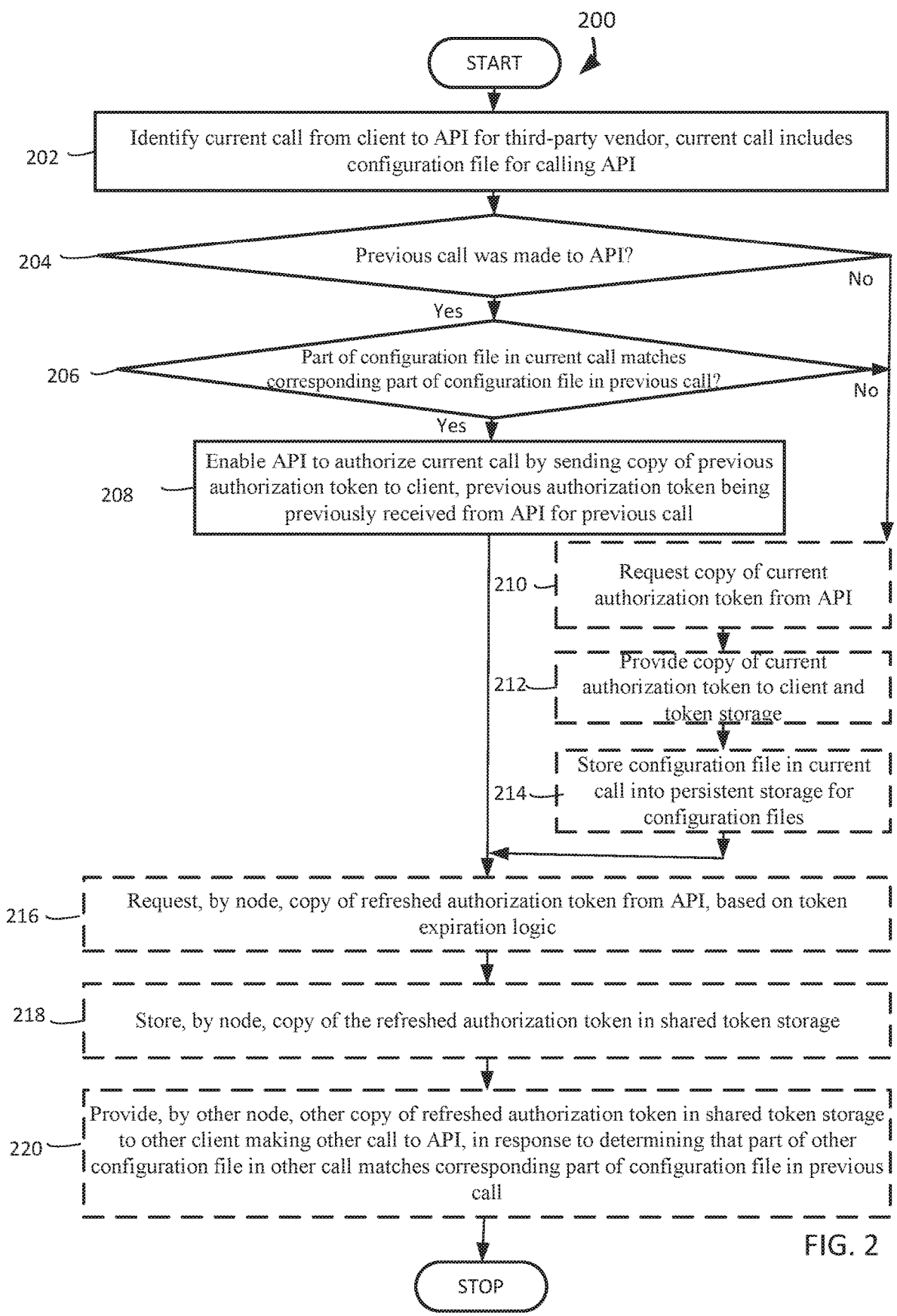
FIG. 2 is an operational flow diagram illustrating a high-level overview of a method for managing authorization tokens for calling third-party vendors, in an embodiment.

FIG. 2 is an operational flow diagram illustrating a high-level overview of a method 200 for managing authorization tokens for calling third-party vendors. As shown in FIG. 2, authorization tokens for calling third-party vendors are managed based on whether the third-party vendor's API has been previously called and whether the configuration file for calling the third-party vendor's API has changed.

A current call from a client to a third-party vendor's API is identified, the current call including a configuration file for calling the third-party vendor's API, block 202. The system identifies calls to third-party vendors' APIs. For example, and without limitation, this can include the server 108 identifying that an authorized user's desktop computer 102 is currently calling the API for the D&B service hosted by the server 110, because the configuration parser 118 identifies that the current call includes the configuration file for the D&B API.

After identifying the current call to the third-party vendor's API, a determination is made whether a previous call was made to the third-party vendor's API, block 204. The system determines whether a currently called third-party vendor's API was previously called. By way of example and without limitation, this can include the server 108 comparing the identifier of the currently called D&B API against a registered list of identifiers for every previously called third-party vendor's API to determine if any user previously called the D&B API. If a previous call was made to the third-party vendor's API, then the method continues to block 206 to determine if the configuration file changed. If no previous call was made to the third-party vendor's API, then the method 200 proceeds to block 210 to request a current authorization token.

If a previous call was made to the third-party vendor's API, a determination is made whether the configuration file in the current call matches the configuration file in the previous call, block 206. The system determines whether the configuration file has changed since the last time the third-party vendor's API was called. In embodiments, since an authorized user previously called the D&B API, this can include the server 108 determining if the current call's configuration file is the same as the previous call's configuration file by comparing a hash of the current call's configuration file request definitions against a hash of the previous call's configuration file request definitions stored in the configuration hashes 122. If the configuration file in the current call matches the configuration file in the previous call, then the method continues to block 208 to use the previous authorization token. If the configuration file in the current call does not match the configuration file in the previous call, then the method 200 proceeds to the block 210 to request a current authorization token.

If the configuration file in the current call matches the configuration file in the previous call, a copy of a previous authorization token is sent to the client to enable the third-party vendor's API to authorize the current call, the previous authorization token being previously received from the third-party vendor's API for the previous call, block 208. The system reuses previous authorization tokens whenever appropriate. For example, and without limitation, since the hash of the current call's configuration file request definitions are the same as the hash of the previous call's configuration file request definitions, this can include the server 108 enabling the D&B API to authorize the desktop computer 102's current call by sending a copy of the previous D&B authorization token, which was previously received, is currently unexpired, and was stored in the token storage 128, to the desktop computer 102. Then the method 200 proceeds to block 216 to optionally refresh the authorization token.

If no previous call was made to the third-party vendor's API, or if a part of the configuration file in the current call does not match the corresponding part of the configuration file in the previous call, then a copy of a current authorization token is optionally requested from the third-party vendor's API, block 210. The system can request new authorization tokens whenever necessary. By way of example and without limitation, this can include the authentication processor 130 using the credentials stored in the credential storage 126 and the configuration file from the current call to create a third-party vendor-understandable authentication call that requests a copy of the current D&B authorization token from the D&B API, because an examination of the registered list of identifiers for every previously called API determines that no previous call was made to the D&B API. In an alternative example, the authentication processor 130 uses credentials stored in the credential storage 126 and the configuration file from the current call to create a third-party vendor-understandable authentication call that requests a copy of the current D&B authorization token from the D&B API, because the hash of the current call's configuration file request definitions does not match the hash of the previous call's configuration file request definitions.

After requesting a copy of a current authorization token, the copy of the current authorization token received from the third-party vendor's API is optionally sent to the client, block 212. The system can send new authorization tokens to the calling clients. In embodiments, this can include the authentication processor 130 receiving a response from the D&B API, parsing a copy of the current D&B authorization token from the response, and sending the copy of the current D&B authorization token to the desktop computer 102 and to the token storage 128.

Having identified a current call, which includes a configuration file, to the third-party vendor's API, the configuration file in the current call is optionally stored into a persistent storage for configuration files, block 214. The system can store configuration files for comparing with configuration files identified in the future. For example, and without limitation, this can include the authentication processor 130 instructing the configuration processor 120 to store the D&B configuration file in the current call to the D&B API into the configuration storage 124.

Periodically, in case of an expired token, and/or on demand, a node optionally requests a copy of a refreshed authorization token from the third-party vendor's API, based on token expiration logic, block 216. The system can refresh authorization tokens. By way of example and without limitation, this can include the executor service 132, which may be in or separate from the first virtual machine 136, using credentials in the credential storage 126 and the configuration file from the configuration storage 124 to create a third-party vendor-understandable authentication call that requests a copy of a refreshed D&B authorization token from the D&B API every 8 hours, because the authorized user of the desktop computer requests a refreshing of authorization tokens every 8 hours. In an alternative example, the executor service 132, which may be in or separate from the first virtual machine 136, uses credentials in the credential storage 126 and the configuration file from the configuration storage 124 to create a third-party vendor-understandable authentication call that requests a copy of a refreshed D&B authorization token from the D&B API every 24 hours because the D&B configuration file specifies a refreshing of its authorization token every 24 hours.

After requesting a copy of a refreshed authorization token, the requesting node optionally stores the copy of the refreshed authorization token in a shared token storage, block 218. A system node can store refreshed authorization tokens for use by the system's other nodes. In embodiments, this can include the executor service 132, which may be in or separate from the first virtual machine 136, storing the copy of the refreshed D&B authorization token in shared token storage 134 that is shared by the virtual machines 136-140.

If a part of another configuration file in another call to the third-party vendor's API matches a corresponding part of the configuration file in the previous call to the third-party vendor's API, another node optionally provides another copy of the refreshed authorization token in the shared token storage to another client making the other call to the third-party vendor's API, block 220. The system's nodes can share refreshed authorization tokens. For example, and without limitation, this can include the third virtual machine 140 providing another copy of the refreshed D&B authorization token, from the shared token storage 134 that is shared by the virtual machines 136-140, to the laptop computer 104 making another call to the D&B API, because the hash of the configuration file's request definitions in the call from the laptop computer 104 to D&B API matches the hash of the configuration file's request definitions in the most recent call to D&B API.

The method 200 may be repeated as desired. Although this disclosure describes the blocks 202-220 executing in a particular order, the blocks 202-220 may be executed in a different order. In other implementations, each of the blocks 202-220 may also be executed in combination with other blocks and/or some blocks may be divided into a different set of blocks.

System Overview

Figure 3:
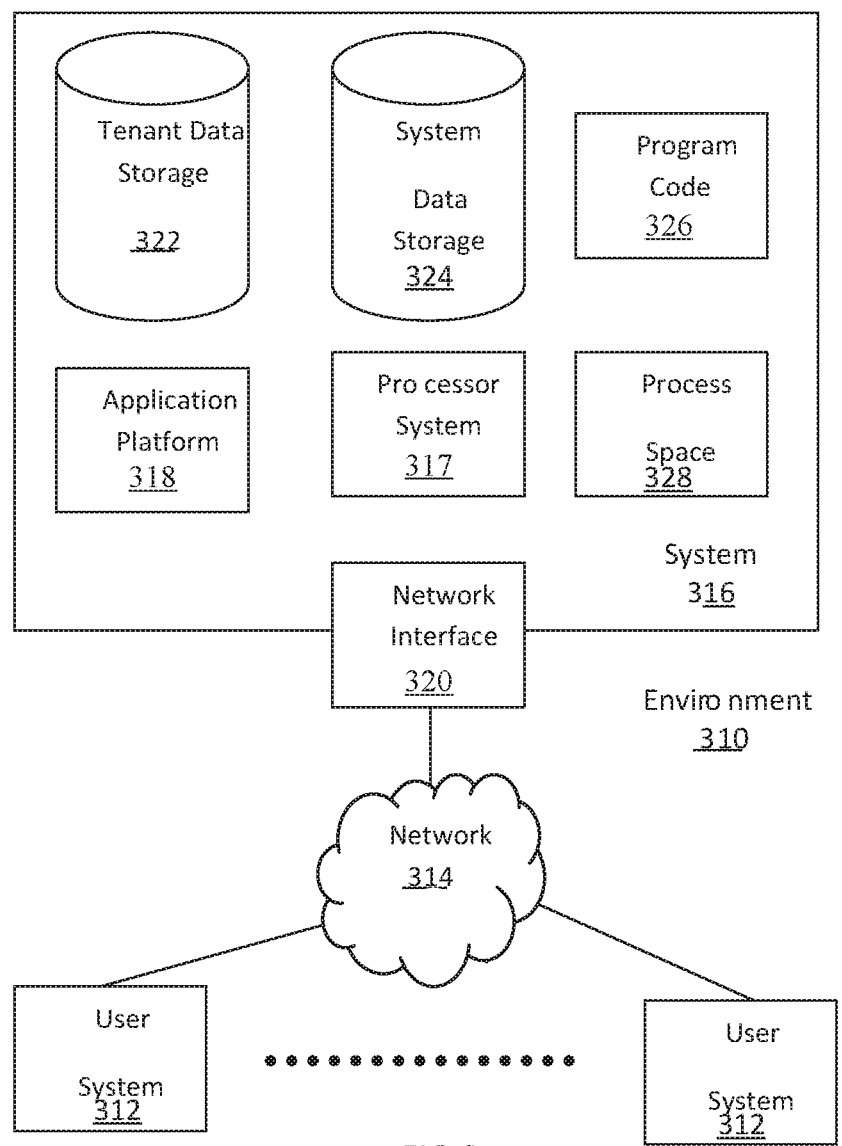
FIG. 3 illustrates a block diagram of an example of an environment wherein an on-demand database service might be used.

FIG. 3 illustrates a block diagram of an environment 310 wherein an on-demand database service might be used. The environment 310 may include user systems 312, a network 314, a system 316, a processor system 317, an application platform 318, a network interface 320, a tenant data storage 322, a system data storage 324, program code 326, and a process space 328. In other embodiments, the environment 310 may not have all of the components listed and/or may have other elements instead of, or in addition to, those listed above.

The environment 310 is an environment in which an on-demand database service exists. A user system 312 may be any machine or system that is used by a user to access a database user system. For example, any of the user systems 312 may be a handheld computing device, a mobile phone, a laptop computer, a work station, and/or a network of computing devices. As illustrated in FIG. 3 (and in more detail in FIG. 4) the user systems 312 might interact via the network 314 with an on-demand database service, which is the system 316.

An on-demand database service, such as the system 316, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, the "on-demand database service 316" and the "system 316" will be used interchangeably herein. A database image may include one or more database objects. A relational database management system (RDMS) or the equivalent may execute storage and retrieval of information against the database object(s). The application platform 318 may be a framework that allows the applications of the system 316 to run, such as the hardware and/or software, e.g., the operating system. In an embodiment, the on-demand database service 316 may include the application platform 318 which enables creation, managing and executing one or more applications developed by the provider of the on-demand database service, users accessing the on-demand database service via user systems 312, or third-party application developers accessing the on-demand database service via the user systems 312.

The users of the user systems 312 may differ in their respective capacities, and the capacity of a particular user system 312 might be entirely determined by permissions (permission levels) for the current user. For example, where a salesperson is using a particular user system 312 to interact with the system 316, that user system 312 has the capacities allotted to that salesperson. However, while an administrator is using that user system 312 to interact with the system 316, that user system 312 has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

The network 314 is any network or combination of networks of devices that communicate with one another. For example, the network 314 may be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

The user systems 312 might communicate with the system 316 using TCP/IP and, at a higher network level, use other common Internet protocols to communicate, such as HTTP, FTP, AFS, WAP, etc. In an example where HTTP is used, the user systems 312 might include an HTTP client commonly referred to as a "browser" for sending and receiving HTTP messages to and from an HTTP server at the system 316. Such an HTTP server might be implemented as the sole network interface between the system 316 and the network 314, but other techniques might be used as well or instead. In some implementations, the interface between the system 316 and the network 314 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, the system 316, shown in FIG. 3, implements a web-based customer relationship management (CRM) system. For example, in one embodiment, the system 316 includes application servers configured to implement and execute CRM software applications as well as provide related data, code, forms, webpages and other information to and from the user systems 312 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, the system 316 implements applications other than, or in addition to, a CRM application. For example, the system 316 may provide tenant access to multiple hosted (standard and custom) applications, including a CRM application. User (or third-party developer) applications, which may or may not include CRM, may be supported by the application platform 318, which manages creation, storage of the applications into one or more database objects and executing of the applications in a virtual machine in the process space of the system 316.

One arrangement for elements of the system 316 is shown in FIG. 3, including the network interface 320, the application platform 318, the tenant data storage 322 for tenant data 323, the system data storage 324 for system data 325 accessible to the system 316 and possibly multiple tenants, the program code 326 for implementing various functions of the system 316, and the process space 328 for executing MTS system processes and tenant-specific processes, such as running applications as part of an application hosting service. Additional processes that may execute on the system 316 include database indexing processes.

Several elements in the system shown in FIG. 3 include conventional, well-known elements that are explained only briefly here. For example, each of the user systems 312 could include a desktop personal computer, workstation, laptop, PDA, cell phone, or any wireless access protocol (WAP) enabled device or any other computing device capable of interfacing directly or indirectly to the Internet or other network connection. Each of the user systems 312 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of the user systems 312 to access, process and view information, pages and applications available to it from the system 316 over the network 314. Each of the user systems 312 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by the system 316 or other systems or servers. For example, the user interface device may be used to access data and applications hosted by the system 316, and to perform searches on stored data, and otherwise allow a user to interact with various GUI pages that may be presented to a user. As discussed above, embodiments are suitable for use with the Internet, which refers to a specific global internetwork of networks. However, it should be understood that other networks may be used instead of the Internet, such as an intranet, an extranet, a virtual private network (VPN), a non-TCP/IP based network, any LAN or WAN or the like.

According to one embodiment, each of the user systems 312 and all of its components are operator configurable using applications, such as a browser, including computer code run using a central processing unit such as an Intel Pentium® processor or the like. Similarly, the system 316 (and additional instances of an MTS, where more than one is present) and all of their components might be operator configurable using application(s) including computer code to run using a central processing unit such as the processor system 317, which may include an Intel Pentium® processor or the like, and/or multiple processor units. A computer program product embodiment includes a machine-readable storage medium (media) having instructions stored thereon/in which may be used to program a computer to perform any of the processes of the embodiments described herein.

Computer code for operating and configuring the system 316 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), micro-drive, and magneto-optical disks, and magnetic or optical cards, Nano-systems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments may be implemented in any programming language that may be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, the system 316 is configured to provide webpages, forms, applications, data and media content to the user (client) systems 312 to support the access by the user systems 312 as tenants of the system 316. As such, the system 316 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein may be implemented as single databases, a distributed database, a collection of distributed databases, a database with redundant online or offline backups or other redundancies, etc., and might include a distributed database or storage network and associated processing intelligence.

Figure 4:
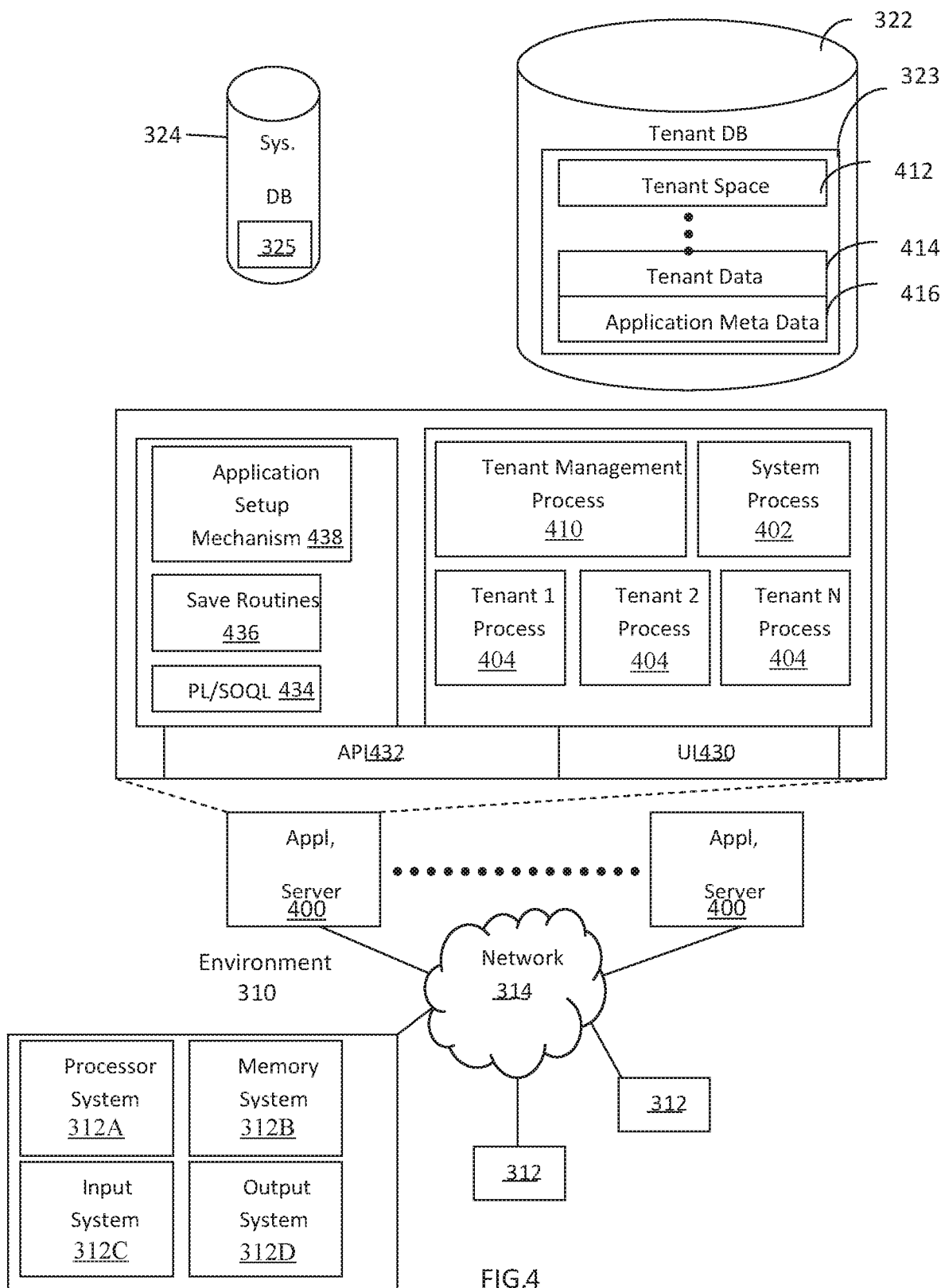
FIG. 4 illustrates a block diagram of an embodiment of elements of FIG. 3 and various possible interconnections between these elements.

FIG. 4 also illustrates the environment 310. However, in FIG. 4 elements of the system 316 and various interconnections in an embodiment are further illustrated. FIG. 4 shows that the each of the user systems 312 may include a processor system 312A, a memory system 312B, an input system 312C, and an output system 312D. FIG. 4 shows the network 314 and the system 316. FIG. 4 also shows that the system 316 may include the tenant data storage 322, the tenant data 323, the system data storage 324, the system data 325, a User Interface (UI) 430, an Application Program Interface (API) 432, a PL/SOQL 434, save routines 436, an application setup mechanism 438, applications servers $400_1$-$400_N$, a system process space 402, tenant process spaces 404, a tenant management process space 410, a tenant storage area 412, a user storage 414, and application metadata 416. In other embodiments, the environment 310 may not have the same elements as those listed above and/or may have other elements instead of, or in addition to, those listed above.

The user systems 312, the network 314, the system 316, the tenant data storage 322, and the system data storage 324 were discussed above in FIG. 3. Regarding the user systems 312, the processor system 312A may be any combination of one or more processors. The memory system 312B may be any combination of one or more memory devices, short term, and/or long-term memory. The input system 312C may be any combination of input devices, such as one or more keyboards, mice, trackballs, scanners, cameras, and/or interfaces to networks. The output system 312D may be any combination of output devices, such as one or more monitors, printers, and/or interfaces to networks.

As shown by FIG. 4, the system 316 may include the network interface 320 (of FIG. 3) implemented as a set of HTTP application servers 400, the application platform 318, the tenant data storage 322, and the system data storage 324. Also shown is the system process space 402, including individual tenant process spaces 404 and the tenant management process space 410. Each application server 400 may be configured to access tenant data storage 322 and the tenant data 323 therein, and the system data storage 324 and the system data 325 therein to serve requests of the user systems 312. The tenant data 323 might be divided into individual tenant storage areas 412, which may be either a physical arrangement and/or a logical arrangement of data. Within each tenant storage area 412, the user storage 414 and the application metadata 416 might be similarly allocated for each user. For example, a copy of a user's most recently used (MRU) items might be stored to the user storage 414. Similarly, a copy of MRU items for an entire organization that is a tenant might be stored to the tenant storage area 412. The UI 430 provides a user interface and the API 432 provides an application programmer interface to the system 316 resident processes to users and/or developers at the user systems 312. The tenant data and the system data may be stored in various databases, such as one or more Oracle™ databases.

The application platform 318 includes the application setup mechanism 438 that supports application developers' creation and management of applications, which may be saved as metadata into the tenant data storage 322 by the save routines 436 for execution by subscribers as one or more tenant process spaces 404 managed by the tenant management process 410 for example. Invocations to such applications may be coded using the PL/SOQL 434 that provides a programming language style interface extension to the API 432. A detailed description of some PL/SOQL language embodiments is discussed in commonly owned U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is incorporated in its entirety herein for all purposes. Invocations to applications may be detected by one or more system processes, which manages retrieving the application metadata 416 for the subscriber making the invocation and executing the metadata as an application in a virtual machine.

Each application server 400 may be communicably coupled to database systems, e.g., having access to the system data 325 and the tenant data 323, via a different network connection. For example, one application server $400_1$ might be coupled via the network 314 (e.g., the Internet), another application server $400_{N-1}$ might be coupled via a direct network link, and another application server $400_N$ might be coupled by yet a different network connection. Transfer Control Protocol and Internet Protocol (TCP/IP) are typical protocols for communicating between application servers 400 and the database system. However, it will be apparent to one skilled in the art that other transport protocols may be used to optimize the system depending on the network interconnect used.

In certain embodiments, each application server 400 is configured to handle requests for any user associated with any organization that is a tenant. Because it is desirable to be able to add and remove application servers from the server pool at any time for any reason, there is preferably no server affinity for a user and/or organization to a specific application server 400. In one embodiment, therefore, an interface system implementing a load balancing function (e.g., an F5 Big-IP load balancer) is communicably coupled between the application servers 400 and the user systems 312 to distribute requests to the application servers 400. In one embodiment, the load balancer uses a least connections algorithm to route user requests to the application servers 400. Other examples of load balancing algorithms, such as round robin and observed response time, also may be used. For example, in certain embodiments, three consecutive requests from the same user could hit three different application servers 400, and three requests from different users could hit the same application server 400. In this manner, the system 316 is multi-tenant, wherein the system 316 handles storage of, and access to, different objects, data and applications across disparate users and organizations.

As an example of storage, one tenant might be a company that employs a sales force where each salesperson uses the system 316 to manage their sales process. Thus, a user might maintain contact data, leads data, customer follow-up data, performance data, goals and progress data, etc., all applicable to that user's personal sales process (e.g., in the tenant data storage 322). In an example of a MTS arrangement, since all of the data and the applications to access, view, modify, report, transmit, calculate, etc., may be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by the system 316 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, the system 316 might also maintain system level data usable by multiple tenants or other data. Such system level data might include industry reports, news, postings, and the like that are sharable among tenants.

In certain embodiments, the user systems 312 (which may be client systems) communicate with the application servers 400 to request and update system-level and tenant-level data from the system 316 that may require sending one or more queries to the tenant data storage 322 and/or the system data storage 324. The system 316 (e.g., an application server 400 in the system 316) automatically generates one or more SQL statements (e.g., one or more SQL queries) that are designed to access the desired information. The system data storage 324 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, filed Apr. 2, 2004, entitled "Custom Entities and Fields in a Multi-Tenant Database System", which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A system comprising:
one or more processors; and
a non-transitory computer readable medium storing a plurality of instructions, which when executed, cause the one or more processors to:
identify a current call from a client computing system to an application programming interface associated with a third-party vendor, the current call comprising a configuration file having data used for configuring the current call to the application programming interface associated with the third-party vendor;
determine whether a previous call was made to the application programming interface;
determine, in response to a determination that the previous call was made to the application programming interface, whether a part of the configuration file in the current call matches a corresponding part of a configuration file in the previous call; and
enable the application programming interface to authorize the current call by sending a copy of a previous authorization token to the client computing system, in response to a determination that the part of the configuration file in the current call matches the corresponding part of the configuration file in the previous call, the previous authorization token being previously received from the application programming interface for the previous call.

2. The system of claim 1, comprising further instructions, which when executed, cause the one or more processors to:
request a copy of a current authorization token from the application programming interface in response to a determination that no previous call was made to the application programming interface; and
provide a copy of the current authorization token to the client computing system and to token storage.

3. The system of claim 1, wherein determining whether the part of the configuration file in the current call matches the corresponding part of the configuration file in the previous call comprises comparing a hash of the part of the configuration file in the current call to a hash of the corresponding part of the configuration file in the previous call.

4. The system of claim 1, comprising further instructions, which when executed, cause the one or more processors to:
request a copy of a current authorization token from the application programming interface in response to a determination that the part of the configuration file in the current call does not match the corresponding part of the configuration file in the previous call; and
provide a copy of the current authorization token to the client computing system and to token storage.

5. The system of claim 1, comprising further instructions, which when executed, cause the one or more processors to store the configuration file in the current call into a persistent storage for configuration files.

6. The system of claim 1, comprising further instructions, which when executed, cause the one or more processors to request, by a node in a system, a copy of a refreshed authorization token from the application programming interface, based on token expiration logic.

7. The system of claim 6, comprising further instructions, which when executed, cause the one or more processors to:
store, by the node, the copy of the refreshed authorization token in a shared token storage; and
provide, by another node in the system, another copy of the refreshed authorization token in the shared token storage to another client computing system making another call to the application programming interface, in response to a determination that a part of another configuration file in the other call matches a corresponding part of the configuration file in the previous call.

8. A computer program product comprising a non-transitory computer-readable medium having a computer readable program code embodied therein to be executed by one or more processors, the program code including instructions to:
identify a current call from a client computing system to an application programming interface associated with a third-party vendor, the current call comprising a configuration file having data used for configuring the current call to the application programming interface associated with the third-party vendor;
determine whether a previous call was made to the application programming interface;
determine, in response to a determination that the previous call was made to the application programming interface, whether a part of the configuration file in the current call matches a corresponding part of a configuration file in the previous call; and
enable the application programming interface to authorize the current call by sending a copy of a previous authorization token to the client computing system, in response to a determination that the part of the configuration file in the current call matches the corresponding part of the configuration file in the previous call, the previous authorization token being previously received from the application programming interface for the previous call.

9. The computer program product of claim 8, wherein the program code comprises further instructions to:
request a copy of a current authorization token from the application programming interface in response to a determination that no previous call was made to the application programming interface; and
provide a copy of the current authorization token to the client computing system and to token storage.

10. The computer program product of claim 8, wherein determining whether the part of the configuration file in the current call matches the corresponding part of the configuration file in the previous call comprises comparing a hash of the part of the configuration file in the current call to a hash of the corresponding part of the configuration file in the previous call.

11. The computer program product of claim 8, wherein the program code comprises further instructions to:
   request a copy of a current authorization token from the application programming interface in response to a determination that the part of the configuration file in the current call does not match the corresponding part of the configuration file in the previous call; and
   provide a copy of the current authorization token to the client computing system and to token storage.

12. The computer program product of claim 8, wherein the program code comprises further instructions to store the configuration file in the current call into a persistent storage for configuration files.

13. The computer program product of claim 8, wherein the program code comprises further instructions to request, by a node in a system, a copy of a refreshed authorization token from the application programming interface, based on token expiration logic.

14. The computer program product of claim 13, wherein the program code comprises further instructions to:
   store, by the node, the copy of the refreshed authorization token in a shared token storage; and
   provide, by another node in the system, another copy of the refreshed authorization token in the shared token storage to another client computing system making another call to the application programming interface in response to a determination that a part of another configuration file in the other call matches a corresponding part of the configuration file in the previous call.

15. A method comprising:
   identifying, by a server computing system, a current call from a client computing system computer to an application programming interface associated with a third-party vendor, the current call comprising a configuration file having data used for configuring the current call to the application programming interface associated with the third-party vendor;
   determining, by the server computing system, whether a previous call was made to the application programming interface;
   determining, by the server computing system, in response to a determination that the previous call was made to the application programming interface, whether a part of the configuration file in the current call matches a corresponding part of a configuration file in the previous call; and
   enabling, by the server computing system, the application programming interface to authorize the current call by sending a copy of a previous authorization token to the client computing system in response to a determination that the part of the configuration file in the current call matches the corresponding part of the configuration file in the previous call, the previous authorization token being previously received from the application programming interface for the previous call.

16. The method of claim 15, the method further comprising:
   requesting a copy of a current authorization token from the application programming interface in response to a determination that no previous call was made to the application programming interface; and
   providing a copy of the current authorization token to the client computing system and to token storage.

17. The method of claim 15, wherein determining whether the part of the configuration file in the current call matches the corresponding part of the configuration file in the previous call comprises comparing a hash of the part of the configuration file in the current call to a hash of the corresponding part of the configuration file in the previous call.

18. The method of claim 15, the method further comprising:
   requesting a copy of a current authorization token from the application programming interface in response to a determination that the part of the configuration file in the current call does not match the corresponding part of the configuration file in the previous call; and
   providing a copy of the current authorization token to the client computing system and to token storage.

19. The method of claim 15, the method further comprising storing the configuration file in the current call into a persistent storage for configuration files.

20. The method of claim 15, the method further comprising:
   requesting, by a node in a system, a copy of a refreshed authorization token from the application programming interface, based on token expiration logic;
   storing, by the node, the copy of the refreshed authorization token in a shared token storage; and
   providing, by another node in the system, another copy of the refreshed authorization token in the shared token storage to another client computing system making another call to the application programming interface in response to a determination that a part of another configuration file in the other call matches a corresponding part of the configuration file in the previous call.

* * * * *